United States Patent [19]

Austin et al.

[11] 4,040,342

[45] Aug. 9, 1977

[54] APPARATUS FOR GENERATION OF CARBON DIOXIDE GAS AND THE CARBONATION OF WATER

[76] Inventors: Robert Roy Austin, 2270 E. Orange Grove Blvd., Pasadena, Calif. 91104; George Noblit Tyson, 4950 N. Live Oak Canyon Road, LaVerne, Calif. 91750

[21] Appl. No.: 622,141

[22] Filed: Oct. 14, 1975

[51] Int. Cl.[2] .......................... A23F 1/00; A23F 3/00; B01J 7/02
[52] U.S. Cl. ..................................... 99/323.1; 23/282; 261/DIG. 7; 220/293
[58] Field of Search ............ 99/323.1–323.3, 99/275, 516; 261/DIG. 7; 426/477; 220/293; 23/282; 222/94, 130

[56] References Cited

U.S. PATENT DOCUMENTS

| 400,318 | 3/1889 | Siebrecht | 23/282 |
| 1,006,773 | 10/1911 | Millar | 426/477 |
| 1,258,682 | 3/1918 | Hood | 220/293 |
| 1,592,993 | 7/1926 | Slate | 426/477 |
| 1,967,553 | 7/1934 | Dietzel | 261/DIG. 7 |
| 3,492,671 | 1/1970 | Hovey | 99/323.1 |

*Primary Examiner*—Harvey C. Hornsby
*Assistant Examiner*—Robert Pous
*Attorney, Agent, or Firm*—Donald D. Mon

[57] ABSTRACT

Apparatus for the generation of carbon dioxide by the reaction of an edible acid and a carbon dioxide-releasing substance in aqueous solution. The gas is generated in a generator chamber and is injected into water contained in an absorber tank to carbonate the water and also to provide pressure for expulsion of the carbonated water from the apparatus.

34 Claims, 7 Drawing Figures

APPARATUS FOR GENERATION OF CARBON DIOXIDE GAS AND THE CARBONATION OF WATER

This invention relates to apparatus for the generation of carbon dioxide and the carbonation of water with the generated gas.

The purest form of carbonated beverage is water that has carbon dioxide dissolved into it without the addition of salts. The well-known Club Soda is often thought to be a simple carbonated water, but this is not true. Instead, it is a complicated formula which often includes citrates, chlorides, phosphates, lithium chloride, and considerable sodium ion. Therefore, despite its widespread availability, persons who have preferences for pure carbonated water cannot use it, but instead must resort to the classical seltzer bottle or to a pressure vessel supplied with carbon dioxide gas from a pressure cartridge. Also, persons wishing to use quantities of carbonated water smaller than the entire contents of the bottle are at a disadvantage, because the bottle must be opened and, when it is recapped, much pressure and carbonation will have been lost as a consequence of the bottle's having been opened and partially emptied.

The seltzer bottle has the disadvantage that it is not refillable by the customer. Should the customer desire to have at hand a substantial quantity of cabonated water, the weight and bulk of seltzer bottles constitute serious disadvantages, especially where a substantial supply of them would have to be carried in vans or campers. Devices which utilize carbon dioxide cartridges do not suffer from the identical disadvantages as seltzer bottles, because they are refillable with water, but the containers are heavy. The bottle must withstand the high pressure required when a suitably small cartridge is to contain a useful quantity of gas. Furthermore, the cartridges must be carried around as an item of inventory.

It is an object of this invention to provide apparatus which can carbonate water as the consequence of a chemical reaction which utilizes substances that can readily be carried around in convenient, lightweight packets containing premeasured quantities.

It is a further object of this invention to provide a device which is suitable for making relatively small quantities of carbonated water at a time. Such a device will be found useful in vans, mobile homes and the like, where storage space is at a premium, and where only a relatively small amount of carbonated water is wanted at a time. A device of this type will not usually be used to prepare much more than one gallon of carbonated water at a time, although it is possible to scale the apparatus up or down in size.

It is another object of this invention to include means which limit the pressure that can be developed in the system, whereby apparatus of reasonable weight and bulk can be used.

Apparatus according to this invention includes an absorber tank for holding water to be carbonated and for retaining the carbonated water under pressure. A discharge tube exits from the absorber tank to release the carbonated water. A valve in the discharge tube selectively permits or prevents flow of carbonated water from the absorber tank. A generator chamber is provided wherein substances are mixed in aqueous solution to generate carbon dioxide. The generator chamber supplies carbon dioxide gas to the absorber tank through an injector conduit. The injector conduit extends from a region in the generator chamber which is intended to contain only gas to a region in the absorber tank intended to contain water to be carbonated. This leaves the residual substances from the gas generation reaction in the generator chamber, and they are not added to the carbonated water.

According to a preferred but optional feature of the invention, means is provided to start the gas generation only after the generator chamber is closed, whereby to prevent or to limit undesired escape of carbon dioxide from the system.

According to another preferred but optional feature of the invention, two container means are provided in the generator chamber, one of which contains water or an aqueous solution of one of the substances, and the other of which holds a dry substance which will react to form carbon dioxide when added to the contents of the other container means.

The above and other features of this invention will be fully understood from the following detailed description and the accompanying drawings, in which:

FIG. 1 is a partially schematic side elevation principally in cross-section showing the presently preferred embodiment of the invention.

FIGS. 2 and 3 are cross-sections taken at lines 2—2 and 3—3 respectively in FIG. 1;

Figure 1:
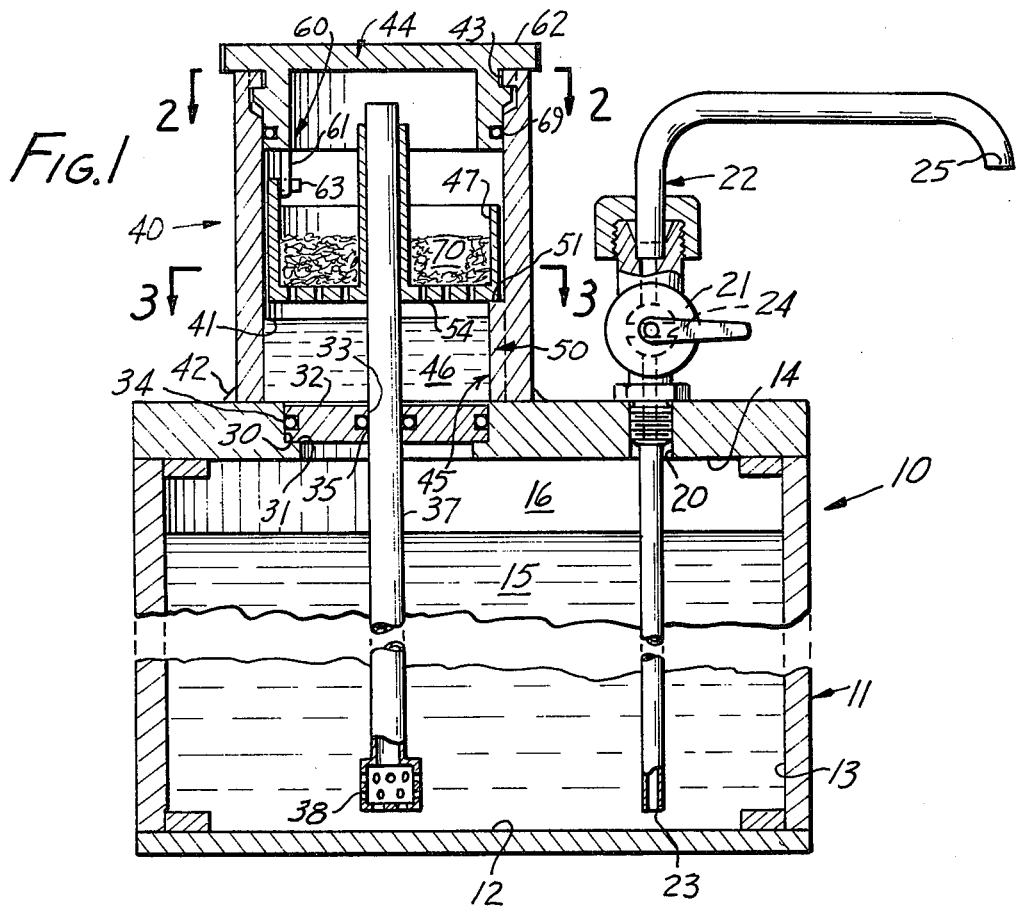

Apparatus 10 according to the invention is shown in FIG. 1. It includes an absorber tank with a bottom 12, a sidewall 13 and a top 14, all joined together to form an airtight tank to hold a body of water 15 to be carbonated under an ullage space 16. Carbon dioxide is intended to be injected into the water, through which the gas will rise to the ullage space and raise the pressure in the system. The pressure of the gas above the water maintains the carbonation and provides for expulsion of the carbonated water.

An exit port 20 is formed in the top of the absorber tank, and a fitting is threaded into the port. A discharge tube 22 passes through the fitting. The tube has a first end 23 which stands below the minimum intended water level in the carbonation tank. The fitting also includes an off-on valve 24 which selectively permits or prevents flow of carbonated water through the discharge tube. The discharge end 25 of the tube can be bent down for convenience in dispensing the carbonated water.

A first inlet port 30 is formed in the top of the absorber tank. A shoulder 31 in the port supports a first removable closure 32, which in this embodiment is a sealing disk with a hole 33 therethrough. Sealing rings respectively seal the disk against the wall of port 30 and the wall of an injector tube 37 (sometimes called an "injector conduit"). In its preferred form, the injector conduit is a "tube," which has a vertically oriented outer wall along which the basket means can slide. The lower end of the injector tube is preferably placed below the level of the water in the absorber tank. A diffuser 38 can, if desired, be placed around the lower end of the injector tube.

The injector tube extends centrally upwardly into a generator chamber 40. The upper end of the injector tube is located near the top thereof in a region where only gas is intended to exist. With this arrangement, no solids or liquid with dissolved salts therein, will be conveyed from the generator tank to the absorber tank by the injector tube.

The generator chamber includes a peripheral sidewall 41 which is attached, for example by a fluid-tight weld 42, to the top of the absorber tank. The generator chamber has a second inlet port 43 at its upper end. A second removable closure 44 is provided to close the second inlet port. First removable closure 32 forms a wall portion of both the absorber tank and of the generator chamber.

A first container means, which comprises the region of the generator chamber atop the sealing disk and inside the peripheral sidewall 41, holds water 46 for the reaction. A basket 47 ("second container means") comprises a sieve-like structure with a central guide 48. The basket is slidable up and down on the vertical injector tube inside the generator chamber.

Figure 3:
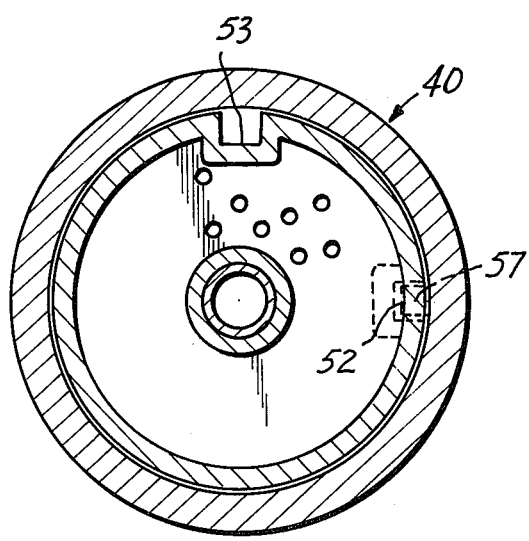

Separator means 50 comprises a ledge 51 at the upper end of a key 52 (see FIG. 3). The key extends axially along the inside of sidewall 41. A groove 53 in the side of basket 48 extends upwardly from the bottom 54 thereof. The bottom of the basket will rest atop the ledge unless the groove and the key are aligned. If they are aligned, the basket can slide down into the water in the first container means to mix the contents of the two container means.

Actuator means 60 comprises a tang 61 which is carried by closure 44 and a finger 63 on the basket. The finger is engageable by the tang to turn the second container means in order to align the groove and key. The term "mixing means" is sometimes used herein synonymously with and in place of "actuator means." Either term is intended to define a means which actuates or moves something, as a consequence of which, substances are ultimately mixed together.

Figure 2:
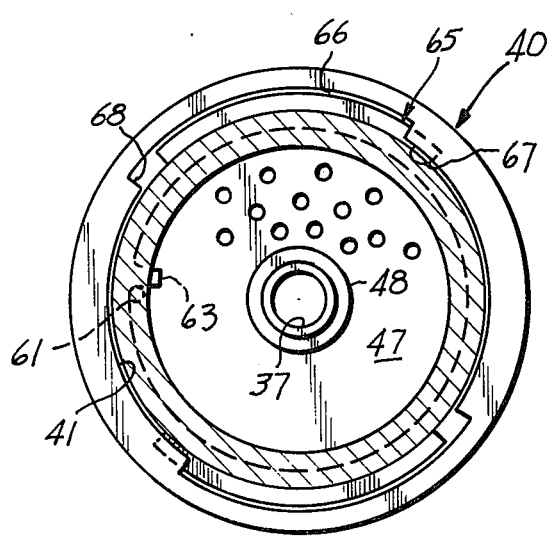

The closure also includes a bayonet coupling 65 (see FIG. 2). In accordance with conventional coupling constructions, segments 66, 67 are respectively formed on the sidewall and on the closure. When aligned with slot 68, segments 67 can axially be passed therethrough. Then the closure can be turned so that parts of segments 66 and 67 overhang and interfere with one another to prevent the axial separation of the closure from the generator chamber. The closed position is shown in FIG. 2. When the closure is in place, the mouth of the generator chamber is sealed by ring seal 69.

When the second removable closure 44 is first put into the second inlet port 42 and before it is closed to lock the bayonet coupling, the groove of the basket is located where it is shown in solid line in FIG. 3. When the closure is turned to close and lock closed the second inlet port, and the tang turns the basket so the groove and key are aligned as shown in dotted line notation. The tang is too short to reach the finger unless the closure 44 is fully inserted into the port 42. Before the port 42 is closed, and the closure is rotated the containers are kept apart from one another by the separation means so the chemicals are not mixed. When the closure is turned and the coupling locked, the basket is turned and drops into the first container means, and the chemicals 70 contained in basket 47 are mixed with water in the first container means. The resulting chemical reaction generates carbon dioxide. This gas will flow through the injector tube into the absorber tank. The injector tube is always open to flow. Generation of the gas was not started until after the structure was closed whereby the loss of carbon dioxide is prevented.

Some of the carbon dioxide which passes through the injector tube will be dissolved in the water in the absorber tank to carbonate the same. Some of the remaining gas will enter the ullage space to raise the system pressure, and some absorption will continue. This gas in the ullage space provides an expulsion pressure enabling carbonated water to be drawn from the absorber tank by opening the valve.

Because gas must be fed into the absorber chamber to carbonate the water, it is necessary to have an ullage space. Therefore the absorber tank should not be completely filled with water.

Figure 4:
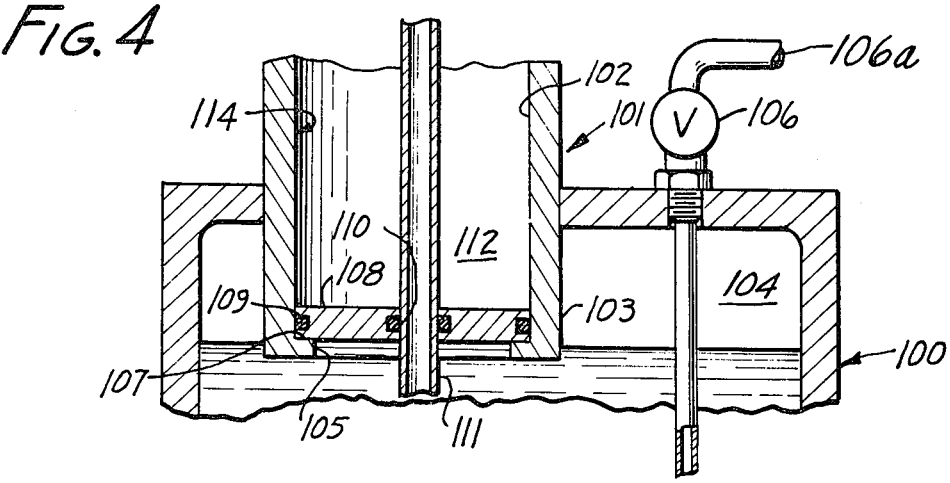
FIG. 4 is a fragmentary axial cross-section of another embodiment of the invention.
Figure 5:
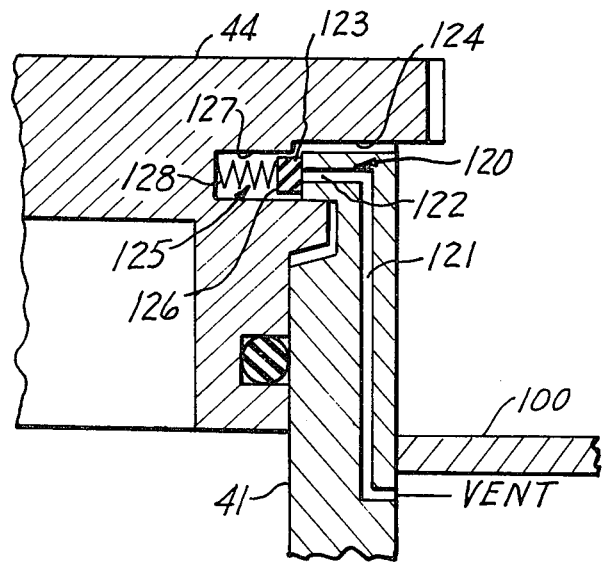
FIG. 5 is a fragmentary cross-section of an optional feature of the invention.

The construction of FIG. 1, while simple, does have some disadvantages which can be corrected by incorporating into it the features shown in FIGS. 4 and 5. For example, in FIG. 4 an absorber tank 100 similar to tank 11 in FIG. 1 has a generator chamber 101 attached thereto, but it has a significant difference in that its peripheral sidewall 102, instead of terminating at the top of the absorber chamber, extends down into the absorber tank so as to provide a depending neck 103 therein. An ullage space 104 is therefore assured when the tank is filled through first inlet port 105 at the bottom of the sidewall valve 106 controls flow through discharge tube 106a.

A ledge 107 is provided at the bottom of the sidewall atop which a first removable closure in the form of a sealing disk 108 can rest. The sealing disk includes a pair of seals 109, 110 to make a full peripheral fluid-tight seal with sidewall 102 and with the outer wall of injector tube 111. The sealing disk can be pulled out of the carbonator along with the injector tube through the second inlet port 114 to leave port 105 open so that water can be poured through it. The sealing disk comprises the bottom for a first container means 112, and a second container means identical to that shown in FIG. 1 can be placed therein. A second removable closure (not shown) 113 identical to closure 44 seals the second inlet port 114 of the generator chamber. First closure means 32 (FIG. 1) and 108 (FIG. 4) are closures in the sense that they close their respective inlet ports to flow through the port per se. This is true even though both of them are pierced by the injector tube. It is immaterial whether the tube passes through the closure, or through the walls of the chamber and tank. In both situations the flow of gas is through the injector tube, and not through the port itself. The removability of the injector tube and of the discs is a substantial convenience when cleaning the carbonator. The two inlet ports can be made large enough to pass ice cubes and other objects, if desired, and it is convenient simply to pull the discs out of the way.

A disadvantage of the embodiments of FIGS. 1 and 4 as shown is that the ullage space is initially filled with air. Therefore, when the carbon dioxide is generated, a portion of the gas in the ullage space will be air which does not carbonate the water. Accordingly, snift means 120 (FIG. 5) may be provided initially to snift off a portion of the air from the ullage space when the generation of the carbon dioxide begins. The snifting should not be so complete as to exhaust a substantial portion of the carbon dioxide. Expulsion of at least part of that air is desirable as a means of limiting the effect of air in the system.

A vent passage 121 extends from the ullage space, and axially in the sidewall of the generator tank, to a snift port 122 adjacent to closure 44. A clearance 123 exists between the walls of the closure and the sidewall, and a plurality of grooves or undercuts 124 are formed in the underface of the closure. Therefore, unless a snift valve 125 is closed, the ullage space is vented.

The snift valve comprises a valve patch 126 which is contained in a bore 127 in the wall of the closure at the location which will be opposite the snift port 122 when the system is fully closed. The patch is a piece of elastomeric material suitable for closing a pressure port. It is backed up by a bias spring 128, and retained by a ring (not shown) in bore 127 at its open end. Except when the valve patch is in the location shown in FIG. 5, the vent is open. This enables a two-step process to be performed. The first step is a partial turning of the closure to lock the closure in place, mix the chemicals, and start the generation of carbon dioxide. At this time, the snift port is open. The next step, after a brief snifting period, is rotation of the closure to the position shown in FIG. 5 where the vent passage is closed and the system is fully closed. The outlet vent, by means of spring 128, also functions to relieve over-pressure should the system be overcharged.

Figure 6:
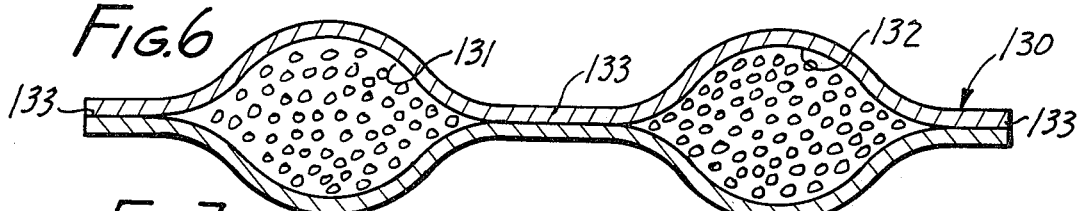
FIG. 6 is a cross-section of a package useful for holding substances to be used with the invention.
Figure 7:
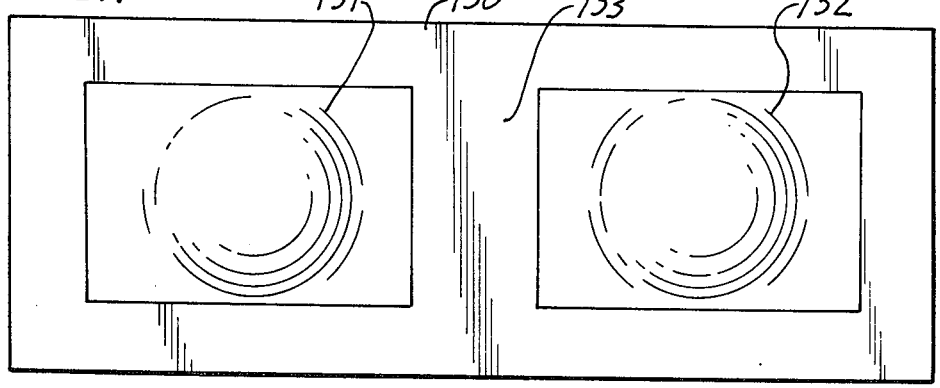
FIG. 7 is a top view of FIG. 6.

FIGS. 6 and 7 show convenient means for packaging the reagents used with this device. It may conveniently comprise a foil package 130 with pockets 131, 132 which are separated from each other by seams 133. Especially when hygroscopic materials are used, it is a convenience to store these materials in separate pockets, although they may be mixed in one or more packets if suitable care is taken to keep the materials very dry.

An advantage of packeting is that it limits the amount of chemicals which can be used in one carbonation sequence. Furthermore, the size of the basket in the generator chamber should be proportioned so it cannot be over-supplied. Although the pressure which can be developed in this reaction tends to be somewhat limited by the partial pressure of the carbon dioxide, still, within limits a higher pressure can be generated with more chemicals than with less chemicals. Accordingly, physical means for limiting pressure such as restricting the quantity of reagent by basket size or by rationing from individual packets is useful.

The chemicals selected should be those which will react with one another when placed together in aqueous solution to generate carbon dioxide. It is feasible to use a liquid acid in the first container means and a solid material in the second container means, but this combination is less convenient to handle than water in the first container means and a dry powder or tablet in the basket. Also, it is possible to place the two dry substances together in the second container just before the procedure is started. If the substances are mixed and tableted, they should be ones which are compatible when dry. Still another arrangement is a two layer pellet of dry acid and sodium bicarbonate.

The reacting materials are kept separate from the water which will be carbonated and consumed. Even so, it is better practice for the materials used to be edible in case there is spillage or leakage of some unintended carry-over into the absorber tank. For this reason the use of edible acids is to be preferred. Also, the edible acids are safer to handle.

The best examples of suitable acids are those which can be tableted or used in a dry form. These are citric, malic and tartaric. If liquid acids are used, then acids such as lactic or acetic acid can be used instead. The acid may be one selected from a group consisting of the foregoing five acids, or mixtures of two or more thereof.

An edible, carbon dioxide-releasing substance should be used for the same reasons why an edible acid should be used. The term "edible" means one which can be ingested by a person in the quantities apt to be encountered in the use of this invention without serious consequences. There are relatively few of such substances, and they are as follows: sodium carbonate, potassium carbonate, sodium bicarbonate, potassium bicarbonate, and calcium carbonate, or mixtures of two or more of these, and the substance to be used will be selected from the group consisting of them, and the said mixtures. Acetic acid should be used when calcium carbonate is chosen. Sodium bicarbonate is the preferred substance because of its low cost, and because it requires less food acid than the carbonates.

A convenient mixture of the two substances is roughly the stoichiometric mixture, and it is surprising how small a quantity of solid material it takes adequately to carbonate a quart of water.

Of the foregoing acids, citric acid has a substantial advantage over the others. It yields three hydrogen ions per molecule because the ionization proceeds from citric acid through dihydrogen citrate and monohydrogen citrate. When the ratio of citric acid to the bicarbonate (when sodium bicarbonate is used) on a molar basis is 1:3, the pressure of carbon dioxide which can be generated is on the order of approximately 100 psig. With the separation and mixing means according to the invention, it is possible to utilize substantially all of the gas from the reaction for carbonization for pressurizing, and it is unnecessary to provide additional reagents to make up for losses which could be expected if the closure had to be put in place after the reaction was started. It is possible to purge the system with carbon dioxide by putting in a little extra material and wasting some gas, or even by purging it in advance with an initial charge. This will purge the upper chamber only, except when the system has a snifter valve for ullage space 16.

It is evident that the generator chamber can be used to produce carbon dioxide gas for any application where such as might be found useful, besides the carbonation of water.

The term "tank" is used herein to mean a container that can be closed and hold a liquid to be carbonated. It is completely closable, except for the always-open injector tube. The term "container means" has been used to describe means to hold or support reactant materials.

A further optional feature of the reagent mixture is the incorporation of an edible defoaming agent which will limit the foaming and assure that there will be substantially no carry-over of the generating mixture into the absorber tank. A suitable example of a defoaming agent is silicone oil. Dimethyl silicone is one example.

This invention provides a conveniently sized relatively lightweight, safe and effective means for generating carbon dioxide gas and for carbonating water. The carbonated water may be used with syrups to make a flavored drink, or as a mixer, or as a beverage.

This invention is not to be limited by the embodiments shown in the drawings and described in the description, which are given by way of example and not of limitation, but only in accordance with the scope of the appended claims.

We claim:

1. Carbonating apparatus comprising: an absorber tank for holding liquid to be carbonated and for retaining the contents under pressure; an inlet port giving access to the inside of said absorber tank; a discharge tube exiting the absorber tank and having a flow passage from inside to outside of the absorber tank; a valve in said discharge tube selectively to permit or to prevent flow of liquid therethrough; a generator chamber adapted to receive substances which, when mixed in aqueous solution, generate carbon dioxide; a removable closure giving access to the inside of said generator chamber; an injector conduit extending from a region in the generator chamber intended to contain gas into the absorber tank; first and second container means in said generator chamber for holding said substances; separator means for releasably holding the second container means away from the first container means; actuator means for causing the substances in the two containers to be mixed; said separator means comprising a key and a groove, one of which is on the first container means and the other of which is on the second container means, and in which the actuator means comprises means carried by the closure, which actuator means is adapted to cause the key and groove to be aligned so that the second container means is enabled to move into the first container means and mix the substances.

2. Apparatus according to claim 1 in which the injector conduit is a tube, and in which the second container means is slidable along the injector tube, the injector tube being substantially vertical.

3. Apparatus according to claim 2 in which the closure means, the injector tube and the actuator means are coaxial, there being a peripheral seal carried by the removable closure making a seal with the generator chamber which remains sealed while the closure is rotated.

4. Apparatus according to claim 1 in which the closure includes a bayonet coupling enabling the closure to be applied to the generator chamber and rotated to be locked in place.

5. Carbonation apparatus comprising: an absorber tank for holdig liquid to be carbonated and for retaining the contents under pressure; an inlet port giving access to the inside of the absorber tank; a discharge tube exiting the absorber tank and having a flow passage from inside to outside of the absorber tank; a valve in said discharge tube selectively to permit or to prevent flow of carbonated liquid therethrough; a generator chamber adapted to receive substances which, when mixed in aqueous solution, generate carbon dioxide; a removable closure giving access to the inside of said generator chamber; an injector conduit extending from a region in the generator chamber intended to contain gas into the absorber tank, the absorber tank being so constructed as to provide an ullage space adjacent to the top thereof; and snift means for snifting off some of the air in the ullage space, said snift means comprising a vent passage extending from the absorber tank to the closure of the generator chamber, said closure carrying a valve member which closes the vent passage when the closure is in its fully closed position.

6. Apparatus according to claim 5 in which the absorber tank is so constructed as to provide an ullage space adjacent to the top thereof.

7. Apparatus according to claim 6 in which the generator includes a peripheral sidewall which extends downwardly into the upper portion of the absorber tank to provide said ullage space between the top of the absorber tank and that portion of the peripheral sidewall of the generator tank which is in the absorber tank.

8. Apparatus according to claim 1 in which the first inlet port extends between the generator chamber and the absorber tank, the first removable closure comprising a removable sealing disc in said first inlet port separating the generator chamber from the absorber tank, the injector tube passing through the disc, and in which the closure, the injector tube, and the disc are aligned, the disc and the injector tube being removable through the second inlet port.

9. Apparatus according to claim 5 in which the absorber tank is so constructed as to provide an ullage space adjacent to the top thereof.

10. Apparatus according to claim 9 in which the generator includes a peripheral sidewall which extends downwardly into the upper portion of the absorber tank to provide said ullage space between the top of the absorber tank and that portion of the peripheral sidewall of the generator tank which is in the absorber tank.

11. Carbonation apparatus comprising: an absorber tank for holding liquid to be carbonated and for retaining the contents under pressure; an inlet port giving access to the inside of the absorber tank; a discharge tube exiting the absorber tank and having a flow passage from inside to outside of the absorber tank; a valve in said discharge tube selectively to permit or to prevent flow of carbonated liquid therethrough; a generator chamber adapted to receive substances which, when mixed in aqueous solution, generate carbon dioxide; a removable closure giving access to the inside of said generator chamber; an injector conduit extending from a region in the generator chamber intended to contain gas into the absorber tank; first and second container means in said generator chamber for holding substances to be used in said reaction, the volume of one of said container means being such that the quantity of a substance which can be held by it is insufficient to generate carbon dioxide pressure in excess of that which the generator chamber and absorber tank can withstand; separator means for holding the second container away from the first container, said separator means comprising a key and a groove, one of which is on the first container means and the other of which is on the second container means, and actuator means carried by the closure which is adapted to cause the key and groove to be aligned so that the second container means is enabled to move into the first container means to mix the substances.

12. Apparatus according to claim 11 in which the first inlet port extends between the generator chamber and the absorber tank, the first removable closure comprising a removable sealing disc in said first inlet port separating the generator chamber from the absorber tank, the injector tube passing through the disc, and in which the closure, the injector tube, and the disc are aligned, the disc and the injector tube being removable through the second inlet port.

13. Carbonation apparatus comprising: an absorber tank for holding liquid to be carbonated and for retaining the contents under pressure; an inlet port giving access to the inside of said absorber tank; a discharge tube exiting the absorber tank and having a flow passage from inside to outside of the absorber tank; a valve in said discharge tube selectively to permit or to prevent flow of carbonated liquid therethrough; a generator chamber adapted to receive substances which, when mixed in aqueous solution, generate carbon dioxide; a removable closure giving access to the inside of said generator chamber; an injector conduit extending from a region in the generator chamber intended to contain gas into the absorber tank; said generator chamber including a peripheral sidewall which extends downwardly into the upper portion of the absorber tank whereby to provide an ullage space between the top of the absorber tank and that portion of the peripheral sidewall of the generator chamber which is in the absorber tank, and snift means for snifting off some of the air in the ullage space comprising a vent passage extending from the absorber tank to the closure of the generator chamber, said closure carrying a valve member which closes the snift passage when the closure is in its fully closed position.

14. Carbonation apparatus comprising: an absorber tank for holding liquid to be carbonated and for retaining the contents under pressure; a first inlet port giving access to the inside of said absorber tank; a first removable closure to close said first inlet port; a discharge tube exiting the absorber tank and having a flow passage extending from a lower level inside the absorber tank to the outside of the absorber tank, a valve in said discharge tube selectively to permit or to prevent flow of carbonated liquid therethrough; a generator chamber adapted to contain substances which, when mixed in aqueous solution, generate carbon dioxide; a second inlet port giving access to the inside of said generator chamber; a second removable closure to close said second inlet port; an injector conduit extending from a region in the generator chamber intended to contain carbon dioxide gas to a lower region inside of said absorber tank where liquid to be carbonated will be held, said injector conduit being the sole connection between the said tank and chamber, said injector conduit being always open to flow; first and second container means in said generator chamber for holding said substances, one of said container means being vertically movable relative to the other; separator means for holding the container means and the substance they respectively contain apart from one another; and actuator means operable on said separator means to enable said one of said container means to move vertically into the other, said separator means comprising spaced alignment means wherein in one relative rotational alignment of the alignment means the container means are constrained in one axial position relative to one another, and in another relative rotational alignment of the alignment means, at least one of the container means is enabled to move axially and linearly by gravity relative to the other.

15. Apparatus according to claim 14 in which the second removable closure, the injector tube and the actuator means are coaxial, there being a peripheral seal carried by the second removable closure making a seal with the generator chamber at the second inlet port which remains sealed while the closure is rotated.

16. Apparatus according to claim 15 in which said seal lies in a plane and is compressive, the second removable closure pressing against its plane, and making a sliding shear movement against it when turned.

17. Apparatus according to claim 14 in which the injector conduit is a vertical tube on which the said one container means is vertically and linearly slidable, and around which it is rotatable.

18. Apparatus according to claim 17 in which the absorber tank is so constructed as to provide an ullage space adjacent to the top thereof.

19. Apparatus according to claim 18 in which the generator includes a peripheral sidewall which extends downwardly into the upper portion of the absorber tank to provide said ullage space between the top of the absorber tank and that portion of the peripheral sidewall of the generator tank which is in the absorber tank.

20. Apparatus according to claim 14 in which said first removable closure comprises a disc through which the injector tube passes, said disc when closing said first inlet port forming part of the bottom of the first container means, and said second container means comprising a basket slidable on the injector tube.

21. Apparatus according to claim 14 in which the absorber tank includes a wall having a portion disposed above said level of water to be carbonated, which wall portion also forms part of the boundary of the generator chamber, said first inlet port being formed through said wall portion, in which said first removable closure comprises a removable sealing disc which is sealingly fitted in said first inlet port, said injector tube passing through said disc and being removable with it, and in which said disc and said injector tube are removable through said second inlet port when the second removable closure is removed.

22. Apparatus according to claim 21 in which said seal lies in a plane and is compressive, the second removable closure pressing against its plane, and making a sliding shear movement against it when turned.

23. Carbonation apparatus comprising: an absorber tank for holding liquid to be carbonated and for retaining the contents under pressure; a first inlet port giving access to the inside of said absorber tank; a first removable closure to close said first inlet port; a discharge tube exiting the absorber tank and having a flow passage extending from a lower level inside the absorber tank to the outside of the absorber tank, a valve in said discharge tube selectively to permit or to prevent flow of carbonated liquid therethrough; a generator chamber adapted to contain substances which, when mixed in aqueous solution, generate carbon dioxide; a second inlet port giving access to the inside of said generator chamber; a second removable closure to close said second inlet port; and an injector conduit extending from a region in the generator chamber intended to contain carbon dioxide gas to a lower region inside of said absorber tank where liquid to be carbonated will be held, said injector conduit being the sole connection between the said tank and chamber, said injector conduit being always open to flow; one of said container means being movable relative to the other, said separator means having the ability to hold them and the substance they contain apart from one another, an in which actuator means is provided which is able to overcome said ability of said separator means and enable the substances to mix; said separator means comprising alignment means, wherein, in one relative alignment of the container means they are constrained in one position relative to one another, and in another position to which they are moved by said mixing means, one container means is enabled to move relative to the other whereby to mix the substances; said alignment means comprising a key and a groove, the key entering the groove in said last-named position.

24. Carbonation apparatus comprising: an absorber tank for holding liquid to be carbonated and for retaining the contents under pressure; a first inlet port giving access to the inside of said absorber tank; a first removable closure to close said first inlet port; a discharge tube exiting the absorber tank and having a flow passage extending from a lower level inside the absorber tank to the outside of the absorber tank, a valve in said discharge tube selectively to permit or to prevent flow of carbonated liquid therethrough; a generator chamber adapted to contain substances which, when mixed in aqueous solution, generate carbon dioxide; a second inlet port giving access to the inside of said generator chamber; a second removable closure to close said second inlet port; and an injector conduit extending from a region in the generator chamber intended to contain carbon dioxide gas to a lower region inside of said absorber tank where liquid to be carbonated will be held, said injector conduit being the sole connection between the said tank and chamber, said injector conduit being always open to flow; said absorber tank including a wall having a portion disposed above said level of water to be carbonated, said wall portion also forming part of the boundary of the generator chamber, said first inlet port being formed through said wall portion; said first removable closure comprising a removable sealing disc which is sealingly fitted in said first inlet port; said injector tube passing through said disc and being removable with it; said disc and said injector tube being removable through said second inlet port when the second removable closure is removed; said generator chamber enclosing first and second container means for holding substances to be used in the said reaction, said disc when closing said first inlet port also forming part of the bottom of the first container means, and said second container means comprising a perforated basket slidable on the injector tube, said injector tube acting as a guide for said basket.

25. Apparatus according to claim 24 in which separator means in provided for holding the second container means away from the first container means, and in which actuator means is provided for causing the substances in the two containers to be mixed.

26. Apparatus according to claim 25 in which the separator means comprises a key and a groove, one of which is on the first container means and the other of which is on the second container means, and in which the actuator means comprises means carried by the second removable closure which is adapted to cause the key and groove to be aligned so that the second container means is enabled to move into the first container means.

27. Apparatus according to claim 26 in which the second removable closure, the injector tube, and the disc are coaxial, there being a peripheral seal carried by the second removable closure making a seal with the generator chamber which remains sealed while the second removable closure is rotated.

28. Apparatus according to claim 25 in which the second removable closure, the injector tube, and the disc are coaxial there being a peripheral seal carried by the second removable closure making a seal with the generator chamber which remains sealed while the second removable closure is rotated.

29. Apparatus according to claim 28 in which the absorber tank is so constructed as to provide an ullage space adjacent to the top thereof.

30. Apparatus according to claim 29 in which the generator includes a peripheral sidewall which extends downwardly into the upper portion of the absorber tank to provide said ullage space between the top of the absorber tank and that portion of the peripheral sidewall of the generator tank which is in the absorber tank.

31. Apparatus according to claim 25 in which the absorber tank is so constructed as to provide an ullage space adjacent to the top thereof.

32. Apparatus according to claim 31 in which the generator includes a peripheral sidewall which extends downwardly into the upper portion of the absorber tank to provide said ullage space between the top of the absorber tank and that portion of the peripheral sidewall of the generator tank which is in the absorber tank.

33. Carbonation apparatus comprising: an absorber tank for holding liquid to be carbonated and for retaining the contents under pressure; a first inlet port giving access to the inside of said absorber tank; a first removable closure to close said first inlet port; a discharge tube exiting the absorber tank and having a flow passage extending from a lower level inside the absorber tank to the outside of the absorber tank, a valve in said discharge tube selectively to permit or to prevent flow of carbonated liquid therethrough; a generator chamber adapted to contain substances which, when mixed in aqueous solution, generate carbon dioxide; a second inlet port giving access to the inside of said generator chamber; a second removable closure to close said second inlet port; and an injector conduit extending from a region in the generator chamber intended to contain carbon dioxide gas to a lower region inside of said absorber tank where liquid to be carbonated will be held, said injector conduit being the sole connection between the said tank and chamber, said injector conduit being always open to flow; said upper portion of the absorber tank being so disposed and arranged as to form an ullage space; snift means for snifting off some of the air from the ullage space comprising a vent passage extending from the absorber tank to said second removable closure, said second removable closure carrying a valve member which closes the vent passage when the closure is in its fully closed position.

34. Apparatus according to claim 33 in which the generator chamber encloses first and second container means for holding said substances, in which said first removable closure comprises a disc through which the injector tube passes, said disc when closing said inlet port forming part of the bottom of the first container means, and said second container means comprising a perforated basket slidable on the injector tube, said injector tube acting as a guide.

* * * * *